United States Patent [19]
Houser et al.

[11] Patent Number: 6,063,892
[45] Date of Patent: May 16, 2000

[54] SPANDEX PREPARED WITH HINDERED DIISOCYANATES

[75] Inventors: Nathan E. Houser, Afton; Chad J. Kolaskie, Lyndhurst, both of Va.

[73] Assignee: E. I. du Pont de Nemours and Company, Wilmington, Del.

[21] Appl. No.: 09/412,813

[22] Filed: Oct. 5, 1999

[51] Int. Cl.$^7$ .......................... C08G 18/76; C08G 18/32; C08G 18/48; C08G 18/10
[52] U.S. Cl. ................................ 528/67; 528/61; 528/64; 528/76; 528/906
[58] Field of Search .................. 528/61, 64, 67, 528/76, 906

[56] References Cited

U.S. PATENT DOCUMENTS

| | | | |
|---|---|---|---|
| 2,929,804 | 3/1960 | Steuber | 528/61 |
| 3,016,364 | 1/1962 | Muller | 528/79 |
| 3,365,347 | 1/1968 | Lund et al. | 564/315 |

FOREIGN PATENT DOCUMENTS 1102819  2/1966  United Kingdom.

OTHER PUBLICATIONS

*Principles of Color Technology*, Second Edition, Fred W. Billmeyer, Jr. and Max Saltzman, A Wiley–Interscience Publication, John Wiley & Sons, 1981, pp. 62, 65 and 68.

*Primary Examiner*—Rabon Sergent
*Attorney, Agent, or Firm*—George A. Frank

[57] ABSTRACT

Polyurethaneureas prepared with 2,2-bis(4-isocyanatophenyl)propane or 1,4-bis(4-isocyanato-alpha,alpha-dimethylbenzyl)benzene, and spandex spun from such polyurethaneureas, are provided.

9 Claims, No Drawings

SPANDEX PREPARED WITH HINDERED DIISOCYANATES

BACKGROUND

1. Field of the Invention

This invention relates to spandex having a combination of high resistance to environmental discoloration and high heat-set efficiency and, more particularly, to such spandex based on certain bulky diisocyanates.

2. Background Art

Spandex is susceptible to discoloration under certain environmental conditions, for example in the presence of atmospheric gases such as nitrogen dioxide. Improved resistance to the environment ("whiteness retention") under these conditions is a desirable attribute.

In the manufacture of tricot knits and women's hosiery, spandex yarns are often knit into the fabric with other yarns. After knitting, the fabric is generally subjected to heat-setting in order to remove wrinkles and stabilize the dimensions of the fabric. Improved heat-set efficiency is desirable to save energy, improve productivity and permit setting of the spandex in fabrics containing fibers such as cotton which cannot tolerate the high temperatures that would be necessary if the heat-set efficiency were lower.

A spandex having a combination of good environmental resistance and good heat-set efficiency is desirable, especially if the mechanical properties of the spandex were not adversely affected.

British Patent 1,102,819 discloses the use of p,p'-isopropylidenediphenyl diisocyanate, alone or in combination with a maximum of 10 mole % of other diisocyanates, to make spandex by reacting it with poly(tetramethyleneether) glycol, chain extending the resulting capped glycol with a diamine, and spinning the resulting polymer. However, the use of p,p'-isopropylidenediphenyl diisocyanate at the levels disclosed in the British patent (≧90 mole %) results in spandex with deficient physical properties.

In general, preparation of ureas is well known. A specific two-step process is described in U.S. Pat. No. 2,929,804, Example V, using poly(tetramethylene oxide) as the glycol and 4-methyl-m-phenylene diisocyanate and p,p'-methylenediphenylisocyanate, both unhindered diisocyanates.

The use of 1,4-bis(4-isocyanato-alpha,alpha-dimethylbenzyl)benzene to make spandex is unknown.

SUMMARY OF THE INVENTION

The spandex of the present invention comprises a polyurethaneurea based on:
 a polyether glycol selected from the group consisting of poly(tetramethyleneether) glycol and poly(tetramethylene-co-3-methyltetramethyleneether) glycol;
 1,1-methylenebis(4-isocyanatobenzene);
 a second diisocyanate; and
 diamine chain extender;
wherein the second diisocyanate is selected from the group consisting of 2,2-bis(4-isocyanatophenyl)propane and 1,4-bis(4-isocyanato-alpha,alpha-dimethylbenzyl)benzene, and present in the range of about 5–50 mole percent of total diisocyanate and wherein the chain extender contains at least 80 mole % ethylene diamine of the total chain extenders.

DETAILED DESCRIPTION OF THE INVENTION

As used herein, spandex has its usual meaning, that is, a filament of a long chain synthetic elastomer comprised of at least 85% by weight segmented polyurethane. Polyurethaneureas useful for making spandex are customarily prepared by reacting ("capping") a difunctional polymer such as a polyether glycol with a diisocyanate to form a prepolymer ("capped glycol"), and then reacting the capped glycol with a diamine ("chain extender") to form the polyurethaneurea, which is then dry- or wet-spun to make the spandex.

Useful polyether glycols include poly(tetramethyleneether glycol) and poly(tetramethylene-co-3-methyltetramethyleneether) glycol. Useful diisocyanates include 1,1-methylenebis(4-isocyanatobenzene) ("MDI"), and the chain extender can be ethylene diamine or mixtures thereof with 2-methyl-1,5-pentanediamine, 1,4-diaminocyclohexane, or 1,3-diaminopentane. A monofunctional amine ("chain terminator") such as diethylamine can be added to control the molecular weight of the polymer.

It has now been found surprisingly that the whiteness retention, percent set, and heat-set efficiency of spandex are improved without detrimentally affecting mechanical properties such as elongation, load power, or unload power when certain specific hindered aromatic diisocyanates are used at low to moderate levels in conjunction with MDI. High levels of these diisocyanates can be detrimental to such mechanical properties and, therefore, the amount of such diisocyanates in the mixture of diisocyanates is limited.

The inventive diisocyanates used to make the spandex of the present invention are 2,2-bis(4-isocyanatophenyl)propane ("Bisphenol A diisocyanate" or "Bis A"), Formula I, and 1,4-bis(4-isocyanato-alpha,alpha-dimethylbenzyl)benzene ("Bisphenol P diisocyanate" or "Bis P"), Formula II.

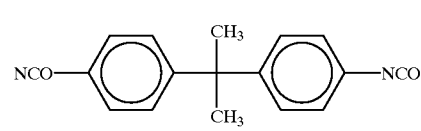

I

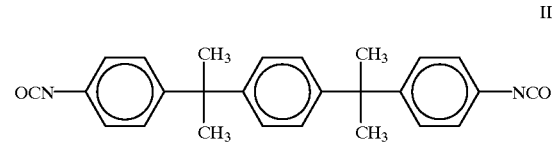

II

A diisocyanate of either Formula I or Formula II is present in the range of about 5–50 mole percent of the mixture of diisocyanates, the remainder being 1,1-methylenebis(4-isocyanatobenzene). About 15–35 (and up to 45) mole percent of one of the diisocyanates of Formula I or II is preferred, with about 20–30 mole percent being more preferred. Of the diisocyanates represented by Formulas I and II, Formula I is preferred.

In the spandex of the present invention, the polyether glycol can be poly(tetramethyleneether) glycol or poly (tetramethylene-co-3-methyltetramethyleneether) glycol. When the glycol is the copolyether, the 3-methyltetramethyleneether moiety can be present in the range of about 4–20 mole percent.

Useful chain extenders include ethylene diamine and mixtures of ethylene diamine with minor amounts up to about 20 mole percent, of 2-methyl-1,5-diaminopentane, 1,3-diaminopentane, and/or 1,4-diaminocyclohexane, so that the ethylene diamine is present to an extent of at least about 80 mole percent.

Certain abbreviations will be used throughout, as follows:

PO4G means poly(tetramethyleneether) glycol,
MDI means 1,1-methylenebis (4-isocyanatobenzene),
Bis A means 2,2-bis(4-isocyanatophenyl)propane
Bis P means 1,4-bis(4-isocyanato-alpha,alpha-dimethylbenzyl)benzene,
EDA means ethylene diamine,
MPMD means 2-methyl-1,5-pentanediamine (DYTEK® A, a registered trademark of E.I. du Pont de Nemours and Company), and
DEA means diethylamine.

When present at levels above about 50 mole % based on total diisocyanate, Bis A and Bis P were detrimental to the physical properties of the spandex, for example, in load power and in tensile strength at elevated temperatures (for example during heat setting). In certain circumstances, even 50 mole % of these diisocyanates can lead to slightly deteriorated physical properties while still bringing about improvement in whiteness retention. Incorporation of 100% Bis A or 100% Bis P into spandex led to deterioration in fiber elongation-at-break, unload power and thermal resistance.

Several different methods can be used to cap polyether glycols with two diisocyanates. In one method, "Method 1", the two diisocyanates can be mixed before being added to the glycol. In another method, "Method 2", the two diisocyanates can be mixed and a portion of the mixture can be added to glycol to form a partially capped glycol followed by the addition of the remainder of the diisocyanate mixture to form a capped glycol. In yet another method, "Method 3", a stoichiometric excess (compared to glycol hydroxyls) of a first diisocyanate (for example MDI) can be added to the glycol to form a capped glycol with isocyanate ends. After the substantial completion of such first-stage capping, the second diisocyanate (for example Bis A) can be added to give the final % NCO level desired before chain extension.

There were surprising advantages found when Method 3 was utilized, specifically, when Bis A was used in the second stage. At equivalent ratios of the two diisocyanates (when compared to the other methods), the spandex ultimately formed had better heat set properties than with the other methods. Also, when one desired to obtain properties equivalent to those obtained by Method 1, diminished quantities of the more expensive Bis A were sufficient.

The strength and elastic properties of the spandex were measured in accordance with the general method of ASTM D 2731-72. Three filaments, a 2-inch (5-cm) gauge length, and zero-to-300% elongation cycles were used for each of the measurements. The samples were cycled five times at a constant elongation rate of 50 cm per minute. In the Tables, Load Power ("LP") and Unload Power ("UP") are reported in decinewtons per tex at 200% extension on the first and fifth cycles, respectively. Percent elongation at break was measured on the sixth extension cycle; all fibers of the invention had elongation at break in excess of 490%. Percent set was measured 30 seconds after the samples had been subjected to five 0–300% elongation/relaxation cycles. The percent set ("% S") was then calculated as $$\% S = 100(Lf-Lo)/Lo,$$

in which Lo and Lf are, respectively, the filament (yarn) length, when held straight without tension, before and after the five elongation/relaxation cycles.

To measure the resistance of the spandex to environmental conditions, cards wound with spandex were immersed in a bath containing 1.5 grams of Duponol EP surfactant (Witco, Memphis, Tenn.) per liter of water. The bath was heated to boiling where it remained for 1 hour (scour). The cards were then rinsed with water and placed into a bath containing water adjusted to pH=5 with dilute phosphoric acid (further adjusted with dilute sodium hydroxide if necessary), and the bath was heated to boiling. The cards remained in this bath for 1 hour (mock dye) after which they were rinsed with distilled water. After air-drying, the b-values of the cards were measured on a Hunter calorimeter and recorded as the starting color. (For definition of the b-value, see Billmeyer and Saltzman, "Principles of Color Technology", $2^{nd}$ edition, John Wiley and Sons, Inc., 1981, pages 62, 65 and 87.) Fume, UV, $NO_2$, and thermal tests were run substantially as described in U.S. Pat. No. 5,219,909 to determine whiteness retention. All tests were performed on fiber which had been scoured and mock dyed as described above, and the difference between the b-value of the scoured and mock dyed fiber and the b-value of the tested fiber was recorded as "delta-b".

To measure heat-set efficiency, yarn samples were mounted on a 10-cm frame and stretched 1.5×. The frame (with sample) was placed in an oven preheated to 175° C. or 190° C. for 90 seconds. The samples were allowed to relax and the frame to cool to room temperature. The samples (still on the frame) were immersed in boiling water for 30 min. The frame and samples were removed from the bath and allowed to dry. The length of the yarn samples was measured, and heat set efficiency (HSE %) was calculated according to the following formula:

$$HSE\% = \frac{\text{heat-set length} - \text{original length}}{\text{stretched length} - \text{original length}} \times 100$$

EXAMPLES

Preparation of Starting Materials
1. Preparation of Bis A

Bis A was prepared by successive reactions: hydrochlorination of alpha-methylstyrene to form alpha-chlorocumene, Friedel-Crafts phenylation of alpha-chlorocumene to form 2,2-diphenylpropane, nitration of 2,2-diphenylpropane to form 2,2'-bis(4-nitrophenyl) propane, hydrogenation of 2,2'-bis(4-nitrophenyl)propane to form 4,4'-isopropylidene-dianiline (bisaniline-A), and subsequent phosgenation to afford the diisocyanate.

a. Preparation of alpha-Chlorocumene

| Reagent | moles | weight (g) | volume (ml) |
| --- | --- | --- | --- |
| PhCMe=$CH_2$ | 2.000 | 236.36 | 260.0 |
| $CH_2Cl_2$ | — | — | 1000.0 |
| HCl | 2.140 | 78.40 | — |

The above amounts of alpha-methylstyrene (PhCMe=$CH_2$) and methylene chloride ($CH_2Cl_2$) were combined under argon in a 2-liter flask immersed in an ice bath. To the stirred mixture was added 78.4 g of anhydrous HCl, at such a rate as to maintain the temperature of the mixture below 10° C. with continued cooling. The mixture was allowed to warm to room temperature, then subjected to rotary evaporation at reduced pressure to remove solvent and excess HCl. The residue contained of 308.43 g (99.7% of theory) of the desired product, alpha-chlorocumene.

b. Preparation of 2,2-Diphenylpropane

| Reagent | moles | weight (g) |
| --- | --- | --- |
| $AlCl_3$ | 0.140 | 18.67 |
| HCl | 0.638 | 23.25 |
| $PhCClMe_2$ | 1.994 | 308.43 |

Benzene (2.5 liters) and the above amount of anhydrous aluminum chloride were combined under argon in a 5-liter flask. The flask and contents were cooled in an ice bath, and the above amount of anhydrous HCl was added. To the stirred and cooled mixture was then added the above amount of alpha-chlorocumene (prepared as in step a), dropwise at a rate to allow control of the reaction temperature at about 10° C. or less by continued cooling with the ice bath. About 15 min following completion of this addition, several hundred grams of ice was added to the reaction mixture with continued stirring. A total of 240 g of 50 wt % aqueous sodium hydroxide solution (3.0 mol NaOH) was then added in portions, alternating with additional portions of ice, so as to maintain the mixture at a temperature below about 18° C. The product mixture was transferred to a separatory funnel, and the aqueous layer was separated and discarded. The organic layer was washed with water, dried over anhydrous magnesium sulfate, and stripped of benzene by rotary evaporation at reduced pressure. The residue, weighing 387.4 g, was shown by proton NMR spectroscopy to contain the desired product along with 9.24 wt % of residual benzene. The yield of 2,2-diphenylpropane was therefore 351.6 g (1.79 mol, 90% of theory). The product was combined with that from several other runs and distilled through a seven-plate Oldershaw column; b.p. 124° C. at 675 Pa.

c. Nitration of 2,2-Diphenylpropane

| Reagent | moles | weight (g) | volume (ml) |
| --- | --- | --- | --- |
| $Ph_2CMe_2$ | 1.200 | 235.55 | — |
| $CH_2Cl_2$ | — | — | 240 |
| $H_2O$ | — | — | 60 |
| $H_2SO_4$ | 6.000 | 588.46 | — |
| $HNO_3$, conc. | 1.500 | 270.11 | 190.22 |

The above amounts of 2,2-diphenylpropane (prepared as in step b), methylene chloride, and water were combined in a 2-liter flask. A mixture of the above amounts of concentrated sulfuric and nitric acids was prepared, and added dropwise to the stirred contents of the flask, maintained at about 10° C. with an ice bath, during a three-hour interval. The reaction mixture was stirred and maintained at about 10° C. for two additional hours following completion of addition, then was warmed cautiously to room temperature and left stirring overnight. The reaction mixture was poured over ice, and the product was extracted with methylene chloride. The crude product solution was washed with water and bicarbonate solution, dried over magnesium sulfate, and stripped of solvent by rotary evaporation at reduced pressure. The residue was recrystallized from 800 ml of toluene to afford 201.8 g of 2,2-bis(4-nitrophenyl)propane (0.70 mol, 59% of theory), m.p. 135–137° C.

d. Hydrogenation of 2,2-Bis(4-nitrophenyl)propane

A mixture of 294 g of 2,2-bis(4-nitrophenyl)propane (1.03 mol; prepared as in step c) was charged in an autoclave along with 2 liters of 1,4-dioxane and 25 g of 5% palladium on carbon. The autoclave was purged with nitrogen, then heated at 60° C. for six hours under 500 psi hydrogen pressure. The product mixture was filtered to remove the catalyst, then stripped of solvent by rotary evaporation at reduced pressure. The solid residue was triturated with a small amount of hexane, then collected and dried by suction filtration under a blanket of nitrogen to afford 224.0 g (0.99 mol, 96% of theory) of 4,4'-isopropylidenedianiline (bisaniline-A), m.p. 130–131.5° C.

e. Phosgenation of Bisaniline-A

In a two-liter reaction vessel, a 96.6 g (0.427-mol) quantity of bisaniline-A (as prepared in step d) was phosgenated in 1200 mL of orthodichlorobenzene (ODCB) using the method commonly known as cold-hot phosgenation: Into 800 ml of cold ODCB in the reaction flask, under a Dry Ice-cooled condenser, was transferred 126 g (1.28 mol) of phosgene. With rapid stirring of the phosgene solution and cooling with an ice-water bath, a slurry of finely ground bisaniline-A in 400 ml of ODCB was added during an interval of about 20 min. The cooling bath was then replaced with a heating mantle, and the reaction mixture was heated, with continued stirring, to a final temperature of 130° C. during a 3 hr interval, or until it was transformed to a clear solution. The mixture was then cooled to room temperature, while excess phosgene was sparged from it in a stream of nitrogen. The products of multiple phosgenation reactions of several portions of diamine, totaling 396.5 g (1.75 moles), were combined, and the ODCB solvent was removed by distillation at reduced (1.33 kPa) pressure (b.p. 57° C.). The residue was then subjected to flash vacuum distillation at 3.2 Pa to afford Bis A as the desired fraction, boiling at 190–200° C. The yield of purified product was 428 g (1.54 mol, 88% of theory); m.p. 91° C.; IR, 2283 cm-1 (NCO); proton NMR, 1.64 ppm (s, 6H, —CH$_3$), 6.99 (d, J=8.6 Hz, 4H, aromatic H meta to NCO), 7.14 (d, J=8.6 Hz, 4H, aromatic H ortho to NCO).

2. Preparation of Bis P

In the same manner as described for the phosgenation of bis-aniline A diisocyanate above, the diamine bis-aniline P [(1,4-bis(4-aminocumyl)benzene; Mitsui Petrochemical, Japan)] was converted to the corresponding diisocyanate (Bis P); m.p. 84–85° C.; IR, 2268 cm-1 (NCO); 1H NMR, 1.63 ppm (s, 12H, —CH$_3$), 6.98 (d, J=8.6 Hz, 4H, aromatic H meta to NCO), 7.08 (s, 4H, aromatic H on center ring), and 7.17 (d, J=8.6 Hz, 4H, aromatic H ortho to NCO).

Preparation of Polymers and Fibers

Preparation of polyurethaneurea by single addition of diisocyanate to a polyether glycol (Method 1) is exemplified, using 100% MDI (control) and 100% EDA. Modifications of this procedure were made in order to carry out Method 2 (mixing the diisocyanates, dividing the mixture into two portions, and adding the portions separately) and Method 3 (adding a first diisocyanate and then a second diisocyanate, Bis A or Bis P).

150 grams of 1800 molecular weight P04G (Terathane® 1800, a registered trademark of E.I. du Pont de Nemours and Company) was mixed with 34.0 grams of MDI and heated to 90° C. The solution was continuously stirred for 90 minutes. To the resulting capped glycol was added 330 grams of DMAc. This solution was stirred until the capped glycol was completely dissolved. To the diluted capped glycol was added a solution of 99 grams of 1.0N EDA in DMAc and 5 grams of 1.2N DEA in DMAc with vigorous stirring. A mixture of additives was mixed into the resulting polymer solution so that the final, dry-spun fiber contained 2 wt % Methacrol® 2138F (a copolymer of diisopropylaminoethyl methacrylate and n-decyl methacrylate in a 75/25 ratio by weight, a registered trademark of E.I. du Pont de Nemours and Company), 1.5 wt % Cyanox 1790 [a hindered phenolic antioxidant (2,4,6-tris(2,6-dimethyl-4-t-butyl-3-hydroxybenzyl)isocyanurate), Cytec Industries, West Patterson, N.J.], and 0.6 wt % silicone oil.

To prepare a polymer having a 90/10 mole ratio of MDI to Bis A, by Method 1, the above recipe was followed except in the first step 30.6 grams of MDI was mixed with 3.8 grams of Bis A, and then this mixture was added to the glycol.

In the Tables that follow, unless otherwise noted, the polyether glycol was 1800 number average molecular weight P04G, MDI was used as the diisocyanate other than Bis A or Bis P, the capping ratio (mole ratio of diisocyanate to polyether glycol) was 1.63, the chain extender was EDA, and fibers were conventionally dry-spun at about 140 meters per minute to give about 60 dtex yarn of 5 coalesced filaments. All elongations-at-break exceeded 490%. Where properties were not measured, "nm" is indicated. The resistance to environmental discoloration is reported as "Whiteness Retention, delta b".

TABLE I

The fibers whose properties are summarized in Table I were spun from polymers prepared by Method 1 at 275 m/min. This Table illustrates the improved whiteness retention and heat-set efficiency provided by the use of up to 50 mole percent Bis A. For this specific composition and fiber, at 50 mole percent Bis A, unload power began to deteriorate slightly.

| Sample | Bis A (mole %) | LP (dN/tex) | UP (dN/tex) | Set (%) | Whiteness Retention (delta b) | | | HSE % at 190° C. |
|---|---|---|---|---|---|---|---|---|
| | | | | | NO$_2$ | UV | fume | Thermal | |
| A | 0 | 0.071 | 0.019 | 33 | 7.2 | 8.5 | 5.0 | 4.4 | 75 |
| B | 5 | 0.071 | 0.021 | 27 | 7.1 | 9.4 | 4.6 | 7.7 | 85 |
| C | 10 | 0.075 | 0.022 | 30 | 4.1 | 7.7 | 2.7 | 3.1 | 83 |
| D | 25 | 0.074 | 0.025 | 19 | 5.0 | 6.6 | 1.6 | 5.7 | 96 |
| E | 50 | 0.065 | 0.018 | 21 | 4.7 | 6.6 | 2.2 | 4.9 | 107 |

TABLE II

The results in Table II confirm that high lievels of Bis A (here 100%) have an adverse affect on the spandex. Sample B broke during thermal testing, indicating inadequate strength at elevated temperatures

| Sample | Bis A (mole %) | LP (dN/tex) | UP (dN/tex) | Whiteness Retention (delta b) | | | |
|---|---|---|---|---|---|---|---|
| | | | | NO$_2$ | UV | fume | Thermal |
| A | 0 | 0.059 | 0.021 | 9.8 | 10.5 | 3.3 | 1.1 |
| B | 100 | 0.029 | 0.017 | 4.4 | 4.7 | 6.6 | Broke |

TABLE III

The polymers used to make the fibers in Table III were prepared with a 90/10 mole ratio of EDA/MPMD chain extenders using Method 1. High levels of Bis A also have a deleterious effect on properties when a mixture of chain extenders is used.

| Sample | Bis A (mole %) | LP (dN/tex) | UP (dN/tex) | Whiteness Retention (delta b) | | | | HSE % at 190° C. |
|---|---|---|---|---|---|---|---|---|
| | | | | NO$_2$ | UV | fume | Thermal | |
| A | 0 | 0.064 | 0.023 | 8.8 | 9.7 | 5.6 | 1.1 | 86 |
| B | 50 | 0.047 | 0.040 | 8.5 | 5.1 | 5.2 | 3.6 | 100 |
| C | 75 | 0.030 | 0.019 | 5.5 | 4.0 | 2.9 | Broke | 100 |
| D | 100 | 0.027 | 0.017 | 7.7 | 3.5 | 2.7 | Broke | n.m. |

TABLE IV

For the spandex in Table IV, the polyether was poly(tetramethylene-co-3-methyltetramethyleneether) glycol having a number average molecular weight of 3500 and containing 12.5 mole % 3-methyltetramethyleneether moiety. Method 1 was used to make the capped glycol with a capping ratio of 1.85. Spandex was spun at 275 meters per minute to give a 5-filament coalesced multifilament yarn of about 67 dtex. The beneficial effects of moderate levels of Bis A are apparent in the whiteness retention and heat-set efficiency data.

| Sample | Bis A (mole %) | LP (dN/tex) | UP (dN/tex) | Set (%) | Whiteness Retention (delta b) | | | | HSE % at 190° C. |
|---|---|---|---|---|---|---|---|---|---|
| | | | | | NO$_2$ | UV | fume | Thermal | |
| A | 0 | 0.041 | 0.022 | 19 | n.m. | 7.8 | 5.8 | n.m. | 70 |
| B | 25 | 0.038 | 0.022 | 20 | n.m. | 6.3 | 3.9 | n.m. | 89 |

TABLE V

Table V shows the use of various MDI/Bis P ratios, using Method 1. As with Bis A, at about 50 mole percent Bis P, some physical properties of the yarn began to deteriorate as indicated by a yarn of Sample D breaking during the heat-set efficiency test (one sample broke and one had HSE % of 130).

| Sample | Bis A (mole %) | LP (dN/tex) | UP (dN/tex) | Set (%) | Whiteness Retention (delta b) | | | | HSE % at 190° C. |
|---|---|---|---|---|---|---|---|---|---|
| | | | | | NO$_2$ | UV | fume | Thermal | |
| A | 0 | 0.071 | 0.021 | 27 | 6.8 | 11.2 | 5.9 | n.m. | 82 |
| B | 10 | 0.053 | 0.019 | 20 | 4.8 | 8.0 | 4.4 | n.m. | 92 |
| C | 25 | 0.050 | 0.019 | 16 | 4.1 | 8.3 | 4.8 | n.m. | 106 |
| D | 50 | 0.040 | 0.016 | 14 | 3.8 | 7.2 | 3.6 | n.m. | >100 |

TABLE VI

Table VI presents properties of spandex from polyurethaneureas made by Method 3 using Bis A with MDI. Total capping ratio for Samples A and B was 1.63 and for Samples C and D was 1.80 (MDI: 1.38, Bis A: 0.25 and MDI: 1.63, Bis A: 0.17, respectively). Samples A and B used 100% EDA chain extender, and Samples C and D used a 90/10 mole ratio of EDA/MPMD. Improvement achieved with the use of Bis A at the levels required by this invention are clearly shown by the data.

| Sample | Bis A (mole %) | LP (dN/tex) | UP (dN/tex) | Set (%) | Whiteness Retention (delta b) | | | | HSE % at 190° C. |
|---|---|---|---|---|---|---|---|---|---|
| | | | | | NO$_2$ | UV | fume | Thermal | |
| A | 0 | 0.081 | 0.024 | 22 | 9.1 | 6.5 | 6.7 | 10.9 | 82 |
| B | 15 | 0.079 | 0.021 | 16 | 3.5 | 6.0 | 2.7 | 7.0 | 96 |
| C | 0 | 0.124 | 0.031 | 29 | 8.6 | 7.5 | 6.8 | 6.7 | 72 |
| D | 9 | 0.084 | 0.024 | 23 | 3.2 | 7.0 | 4.1 | 6.9 | 85 |

TABLE VII

Sample A was prepared using a two-step method, Method 3, employing 18 mole % Bis A at a total capping ratio of 1.63 (MDI: 1.33, Bis A: 0.30). Sample B is the same as Sample D in Table I, prepared in a 1-step method, Method 1, utilizing 25 mole % Bis A. Table VII shows that even at slightly lower Bis A content, the 2-step method (first stage with MDI, second stage with Bis A) affords a yarn comparable or slightly superior to yarn obtained from a polymer prepared by a 1-step method.

| Sample | Bis A (mole %) | LP (dN/tex) | UP (dN/tex) | Set (%) | Whiteness Retention (delta b) | | | | HSE % at 190° C. |
|---|---|---|---|---|---|---|---|---|---|
| | | | | | $NO_2$ | UV | fume | Thermal | |
| A | 18 | 0.052 | 0.017 | 15 | 3.1 | 7.0 | 2.2 | 5.2 | 100 |
| B | 25 | 0.074 | 0.025 | 19 | 5.0 | 6.6 | 1.6 | 5.7 | 96 |

We claim:

1. Spandex comprising a polyurethaneurea derived from:

a polyether glycol selected from the group consisting of poly(tetramethyleneether) glycol and poly(tetramethylene-co-3-methyltetramethyleneether) glycol;

1,1-methylenebis(4-isocyanatobenzene);

a second diisocyanate; and diamine chain extender;

wherein the second diisocyanate is selected from the group consisting of 2,2-bis(4-isocyanatophenyl)propane and 1,4-bis(4-isocyanato-alpha,alpha-dimethylbenzyl)benzene and is present in the range of about 5–50 mole % of total diisocyanate and wherein the chain extender contains at least 80 mole % ethylene diamine of the total chain extenders.

2. The spandex of claim 1 wherein the second diisocyanate is present in the range of about 15–35 mole percent of total diisocyanate.

3. The spandex of claim 1 wherein the chain extender contains less than 20 mole % diamine selected from the group consisting of 2-methyl-1,5-diaminopentane, 1,3-diaminopentane, and 1,4-diaminocyclohexane.

4. The spandex of claim 3 wherein the second diisocyanate is 2,2-bis(4-isocyanatophenyl)propane.

5. The spandex of claim 4 wherein the polyether glycol is poly(tetramethylene-co-3-methyltetramethyleneether) glycol.

6. The spandex of claim 4 wherein the polyether glycol is poly(tetramethyleneether) glycol.

7. The spandex of claim 5 wherein the polyether glycol contains about 4–20 mole % 3-methyltetramethyleneether moiety.

8. A method for preparing polyurethaneurea comprising the steps of:

(a) contacting a polyether glycol selected from the group consisting of poly(tetramethyleneether) glycol and poly(tetramethylene-co-3-methyltetramethyleneether) glycol with a mixture of diisocyanates containing 95–50 mole % of the mixture of 1,1-methylenebis(4-isocyanatobenzene) and 5–50 mole % of the mixture of a second diisocyanate selected from the group consisting of 2,2-bis(4-isocyanatophenyl)propane and 1,4-bis(4-isocyanato-alpha,alpha-dimethylbenzyl)benzene; and (b) contacting the product of step (a) with diamine chain extender containing at least 80 mole % ethylene diamine of the total chain extenders.

9. A method of preparing polyurethaneurea comprising the steps of:

(a) contacting a polyether glycol selected from the group consisting of poly(tetramethyleneether) glycol and poly(tetramethylene-co-3-methyl-tetramethyleneether) glycol with 1,1-methylenebis(4-isocyanatobenzene);

(b) contacting the product of step (a) with a second diisocyanate selected from the group consisting of 2,2-bis(4-isocyanatophenyl)propane and 1,4-bis(4-isocyanato-alpha,alpha-dimethylbenzyl)benzene; and (c) contacting the product of step (b) with diamine chain extender containing at least 80 mole % ethylene diamine of the total chain extenders.

* * * * *